United States Patent
Roach et al.

(10) Patent No.: US 8,321,592 B2
(45) Date of Patent: Nov. 27, 2012

(54) METHODS, SYSTEMS, AND COMPUTER READABLE MEDIA FOR GENERATING AND USING STATELESSLY REVERSIBLE REPRESENTATIONS OF SESSION INITIATION PROTOCOL (SIP) INFORMATION BY SIP CLUSTER ENTITIES

(75) Inventors: Adam B. Roach, Dallas, TX (US); Ben A. Campbell, Irving, TX (US); Robert J. Sparks, Plano, TX (US); Ajay P. Deo, Lewisville, TX (US)

(73) Assignee: Tekelec, Inc., Morrisville, NC (US)

( * ) Notice: Subject to any disclaimer, the term of this patent is extended or adjusted under 35 U.S.C. 154(b) by 314 days.

(21) Appl. No.: 12/637,572

(22) Filed: Dec. 14, 2009

(65) Prior Publication Data

US 2010/0174821 A1 Jul. 8, 2010

Related U.S. Application Data

(60) Provisional application No. 61/122,255, filed on Dec. 12, 2008.

(51) Int. Cl.
*G06F 15/16* (2006.01)
(52) U.S. Cl. ........ 709/245; 709/230; 709/227; 709/228; 709/229
(58) Field of Classification Search .................. 709/230, 709/245, 227–228
See application file for complete search history.

(56) References Cited

U.S. PATENT DOCUMENTS

| | | | |
|---|---|---|---|
| 6,992,974 B1 * | 1/2006 | Tripathi ........................ | 370/216 |
| 8,095,681 B2 * | 1/2012 | Yumoto et al. ................ | 709/232 |
| 2004/0095932 A1 * | 5/2004 | Astarabadi et al. ........... | 370/389 |
| 2005/0135335 A1 * | 6/2005 | Hession et al. ................ | 370/352 |
| 2005/0147087 A1 | 7/2005 | Sternagle | |
| 2005/0210292 A1 * | 9/2005 | Adams et al. .................. | 713/201 |
| 2006/0098577 A1 * | 5/2006 | MeLampy et al. ............ | 370/238 |
| 2006/0242300 A1 * | 10/2006 | Yumoto et al. ................ | 709/226 |
| 2007/0022289 A1 * | 1/2007 | Alt et al. ........................ | 713/168 |
| 2007/0109979 A1 | 5/2007 | Fu et al. | |
| 2007/0115806 A1 | 5/2007 | Onorato et al. | |

(Continued)

FOREIGN PATENT DOCUMENTS

EP   1 962 464 A1   8/2008

(Continued)

OTHER PUBLICATIONS

Notification of Transmittal of the International Search Report and the Written Opinion of the International Searching Authority, or the Declaration for International Application No. PCT/US2009/067925 (Jul. 27, 2010).

(Continued)

*Primary Examiner* — Hieu Hoang
(74) *Attorney, Agent, or Firm* — Jenkins, Wilson, Taylor & Hunt, P.A.

(57) ABSTRACT

The subject matter described herein relates to methods, systems, and computer readable media for generating and using statelessly reversible representations of SIP information by SIP cluster entities. One method includes, at a first SIP cluster entity, receiving a first SIP message including SIP information. The method further includes generating a second SIP message including a statelessly reversible representation of the SIP information. The method further includes transmitting, to a SIP entity that is not a member of the cluster to which the first SIP entity belongs, the second SIP message with the statelessly reversible representation and information for reaching the cluster.

17 Claims, 5 Drawing Sheets

U.S. PATENT DOCUMENTS

| | | | |
|---|---|---|---|
| 2007/0153813 A1* | 7/2007 | Terpstra et al. | 370/401 |
| 2007/0156909 A1* | 7/2007 | Osborn et al. | 709/227 |
| 2008/0069065 A1* | 3/2008 | Wu et al. | 370/340 |
| 2008/0092224 A1* | 4/2008 | Coulas et al. | 726/12 |
| 2008/0108348 A1* | 5/2008 | Kottilingal et al. | 455/435.1 |
| 2008/0222724 A1* | 9/2008 | Ormazabal et al. | 726/23 |
| 2008/0235381 A1* | 9/2008 | Tanizawa et al. | 709/227 |
| 2009/0016495 A1* | 1/2009 | Malas et al. | 379/37 |
| 2009/0092131 A1* | 4/2009 | Hu et al. | 370/356 |
| 2009/0177784 A1* | 7/2009 | Olson et al. | 709/228 |

FOREIGN PATENT DOCUMENTS

| | | |
|---|---|---|
| WO | WO 2010/068948 A2 | 6/2010 |

OTHER PUBLICATIONS

Froment et al., "Addressing Record-Route Issues in the Session Initiation Protocol (SIP)," Network Working Group, draft-ietf-sip-record-route-fix-05 (Aug. 14, 2009).

Jennings et al., "Managing Client Initiated Connections in the Session Initiation Protocol (SIP)," Network Working Group, draft-ietf-sip-outbound-16 (Oct. 29, 2008).

Rosenberg et al., "Traversal Using Relays around NAT (TURN): Relay Extensions to Session Traversal Utilities for NAT (STUN)," Internet-Draft, draft-ietf-behave-turn-10 (Sep. 29, 2008).

Hilt et al., "A Framework for Session Initiation Protocol (SIP) Session Policies," SIPPING Working Group, draft-ietf-sip-session-policy-framework-04 (Aug. 22, 2008).

Petrie et al., "A Framwork for Session Initiation Protocol User Agent Profile Delivery," SIPPING Internet-Draft, draft-ietf-sipping-config-framework-15 (Feb. 13, 2008).

Willis et al., "Session Initiation Protocol (SIP) Extension Header Field for Service Route Discovery During Registration," Network Working Group, RFC 3608 (Oct. 2003).

Rosenberg et al., "An Extension to the Session Initiation Protocol (SIP) for Symmetric Response Routing," Network Working Group, RFC 3581 (Aug. 2003).

Willis et al., "Session Initiation Protocol (SIP) Extension Header Field," Network Working Group, RFC 3327 (Dec. 2002).

Schulzrinne, "Dynamic Host Configuration Protocol (DHCP-for-IPv4) Option for Session Initiation Protocol (SIP) Servers," Network Working Group, RFC 3361 (Aug. 2002).

Rosenberg et al., "Session Initiation Protocol (SIP): Locating SIP Servers," Network Working Group, RFC 3263 (Jun. 2002).

Hardie, "Distributing Authoritative Name Servers via Shared Unicast Addresses," Network Working Group, RFC 3258 (Apr. 2002).

* cited by examiner

METHODS, SYSTEMS, AND COMPUTER READABLE MEDIA FOR GENERATING AND USING STATELESSLY REVERSIBLE REPRESENTATIONS OF SESSION INITIATION PROTOCOL (SIP) INFORMATION BY SIP CLUSTER ENTITIES

PRIORITY CLAIM

This application claims the benefit of U.S. Provisional Patent Application Ser. No. 61/122,255, filed Dec. 12, 2008; the disclosure of which is incorporated herein by reference in its entirety.

TECHNICAL FIELD

The subject matter described herein relates to the mapping of SIP information. More particularly, the subject matter described herein relates to methods, systems, and computer readable media for generating and using statelessly reversible representations of session initiation protocol (SIP) information by SIP cluster entities.

BACKGROUND

In many SIP contexts, it may be desirable to map SIP information, such as information in the contact header field, the via header field, the record route header field, the call id header field, the path header field, the service route header field, the to header field, the from header field, the referred to header field, or the referred by header field of a SIP message, from its original representation to another representation. For instance, in the SIP registration contexts, an originating SIP user agent client generates a registration message with a contact header field that contains an address at which the user agent client sending the registration message (for first party registration) desires to be reached. For example, a user may have an address of record of SIPuser1@XYZcorp.com. SIPuser1@XYZcorp.com is the address of record and would be included in the "To" and "From" header fields of a registration message sent by SIPuser1. The contact address header field for SIPuser1 may contain an IP address at which the user desires to be contacted for this registration context. The register message is sent to a registrar, which stores a mapping between the address of record and the contact address. It may be desirable to map the contact address to another value so that the contact address will not be visible in the SIP registration message and subsequent SIP signaling.

Some network operators may utilize gateway nodes, such as session border controllers, to map the information stored in a contact address header field of a register message to another value for security or privacy purposes. Continuing with the example above, the original register message with the contact address may be sent from a user agent client to a session border controller. The session border controller may map the IP address in the contact address header field to another value, for example, to maintain privacy of the IP address. The session border controller stores the mapping between the IP address and its translated value in a database entry for registration context, thus maintaining state information for the registration context. The session border controller then sends the modified register message to the registrar, which stores the mapping between the modified contact header field information and the address of record. The translated contact header field information maintained by the registrar is not statelessly reversible because the stored state information maintained by the session border controller must be accessed to determine the original contact information.

One problem with having session border controllers maintain stateful mappings between contact address information and mappings of that information is that the mappings must be shared when session border controllers or other SIP nodes are operated as a cluster. For example, it may be desirable to have a cluster of session border controllers that function as active-standby or load sharing entities for each other. In such a cluster, it is necessary to synchronize the stateful mappings of SIP information between the cluster entities. In one example where a cluster node that stores a stateful mapping fails and is replaced by standby cluster node, the standby cluster node must have a copy of the stateful mapping information stored by the first cluster node for a registration or other context. If the standby cluster node does not obtain the stateful mapping information before the active cluster node fails, the standby cluster node will not be able to map the SIP information to its original value. As a result transactions requiring the stateful mapping will fail. Requiring cluster nodes to synchronize stateful routing address mappings with each other consumes cluster node resources and network bandwidth.

Accordingly, there exists a need for methods, systems, and computer readable media for generating and using statelessly reversible representations of SIP information by SIP cluster entities.

SUMMARY

The subject matter described herein relates to methods, systems, and computer readable media for generating and using statelessly reversible representations of SIP information by SIP cluster entities. One method includes, at a first SIP cluster entity, receiving a first SIP message including SIP information. The method further includes generating a second SIP message including a statelessly reversible representation of the SIP information. The method further includes transmitting, to a SIP entity that is not a member of the cluster to which the first SIP entity belongs, the second SIP message with the statelessly reversible representation and information for reaching the cluster.

The subject matter described herein for generating and using statelessly reversible representations of SIP information by SIP cluster entities can be implemented using a non-transitory computer readable medium having stored thereon instructions that when executed by a processor of a computer control the computer to perform steps. Exemplary computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
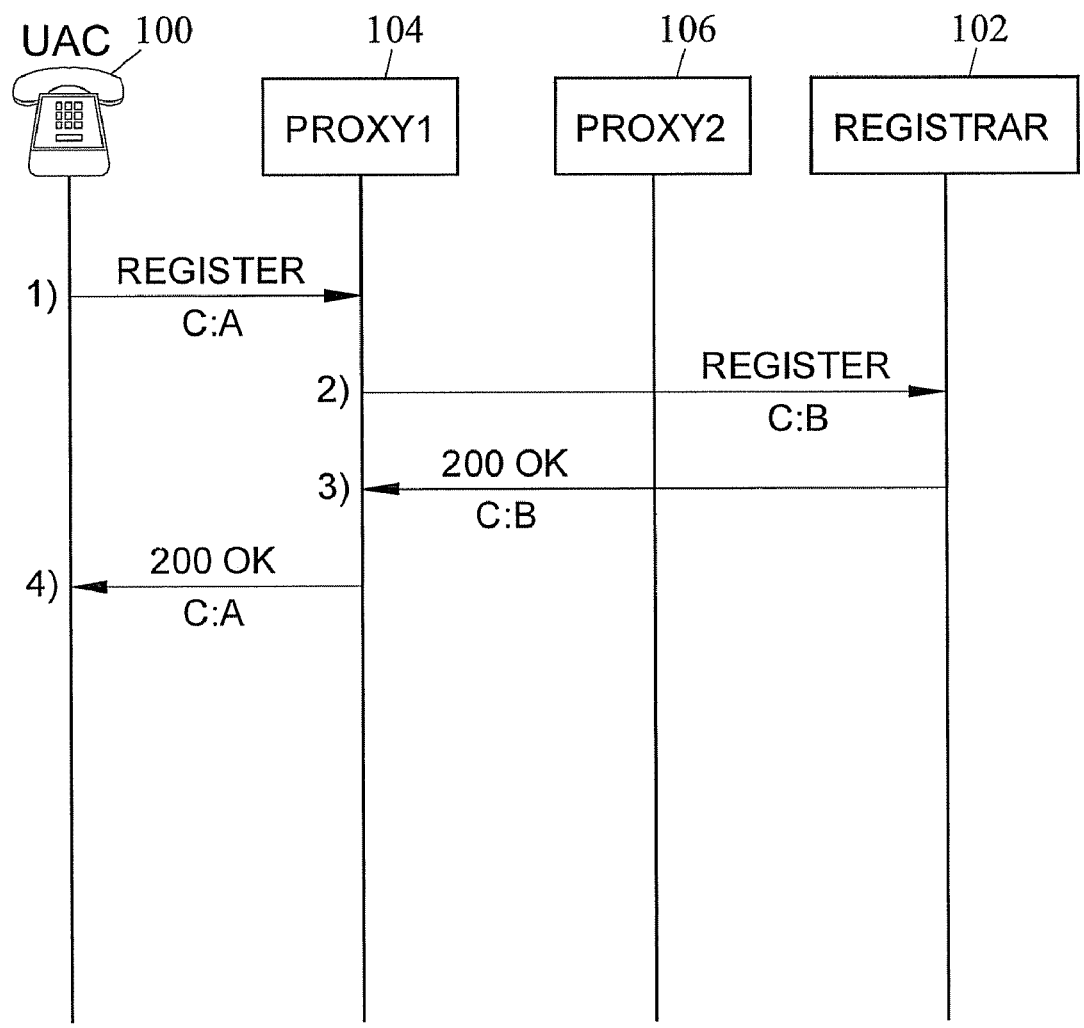
FIG. 1 is a message flow diagram illustrating a method for generating and using a statelessly reversible representation of SIP information by a SIP cluster entity in a registration context according to an embodiment of the subject matter described herein.

The subject matter described herein includes methods, systems, and computer readable media for generating and using statelessly reversible representations of SIP information by SIP cluster entities. In one example, a statelessly reversible representation may be generated and used by SIP cluster entities in a SIP registration context. FIG. 1 is a message flow diagram illustrating a method for generating and using a statelessly reversible representation of SIP information by a SIP cluster entity in a registration context according to an embodiment of the subject matter described herein. Referring to FIG. 1, a SIP user agent client (UAC) 100 may desire to register its contact information with a SIP registrar 102. The network in which registrar 102 resides may include SIP proxies 104 and 106 that form a cluster. SIP proxies 104 and 106 may operate as active-standby entities for each other or may function in a load sharing manner. In addition, although two SIP proxies are illustrated, it is understood that more than two SIP proxies may form the cluster. Further, although the SIP cluster entities illustrated in FIG. 1 are SIP proxies, the methods and systems described herein for generating and using statelessly reversible mappings of SIP information may be implemented by any suitable cluster nodes, including session border controllers and other types of back-to-back user agents, without departing from the scope of the subject matter described herein.

Referring to line 1 of the message flow diagram, user agent client 100 sends a SIP register message to SIP proxy 104. The SIP register message includes the address of record of the user agent and a contact header field that specifies an address at which the user agent client desires to be contacted for this registration context. The contact address information is shown symbolically by A in FIG. 1. In an actual register message, the contact address may be an IP address or a domain name at which UAC 100 desires to be contacted. In line 2 of the message flow diagram, SIP proxy 104 generates a statelessly reversible representation of the contact address information A and inserts the statelessly reversible representation of the contact address information in the contact header field of a second register message. SIP proxy 104 transmits the second register message to registrar 102, which is not a member of the cluster of SIP proxies 104 and 106. It should be noted that SIP proxy 104 does not store a mapping between the original contact header field information and the statelessly reversible representation of the contact header field information or communicate such a mapping to other cluster nodes, such as SIP proxy 106. Instead, the statelessly reversible representation is algorithmically reversible by SIP proxy 106 into the original contact information without storing any state information regarding the original contact header field information or the registration context. The statelessly reversible representation may include a plaintext version of at least a portion of the original contact header field information, an encrypted version of at least a portion of the original contact header field information, or a combination of plaintext and encrypted portions of the original contact header field information. The following two examples illustrate SIP register messages before and after the mapping.

BEFORE: REGISTER sip:reg.example.com SIP/2.0 Contact: sip:line1@192.168.1.17

AFTER: REGISTER sip:reg.example.com SIP/2.0 Contact:sipline1%40192.168.1.17@proxy.example.com In the register message examples above, the original contact header field information is sipline1@192.168.1.17, which is a URI containing an IP address. The statelessly reversible representation of the original contact header field information is sipline1%40192.168.1.17@proxy.example.com. The portion of the mapped information % 40 is an escape sequence that replaces the first @ symbol in the statelessly reversible representation of the original contact header field. The portion proxy.example.com ensures that any further information relating to the SIP register message will be delivered to the same cluster as the originating SIP proxy or session border controller.

In another example, the contact information may be encrypted. Any suitable encryption algorithm may be used. In one example, proxies 104 and 106 may use a symmetric encryption algorithm where proxies 104 and 106 share a private key. In an alternate example, proxies 104 and 106 may use an asymmetric or public key encryption algorithm.

When registrar 102 receives the register message, registrar 102 stores a mapping in the registration database between the address of record for the user agent client and the statelessly reversible representation of the contact header field information. In line 3 of the message flow diagram, registrar 102 sends a 200 ok message to proxy 104 including the statelessly reversible representation of the contact header field information as the contact header field. In line 4 of the message flow diagram, proxy 104 algorithmically reverses the statelessly reversible mapping of the contact header field information to the original contact header field information and sends a 200 ok message to user agent client 100.

Because a statelessly reversible representation of the contact header field information is generated and used by the SIP cluster entities, if proxy 104 fails or is not included in the path of a subsequent message relating to the same registration context, proxy 106 or other cluster entity may algorithmically generate the original contact header field information.

Figure 2:
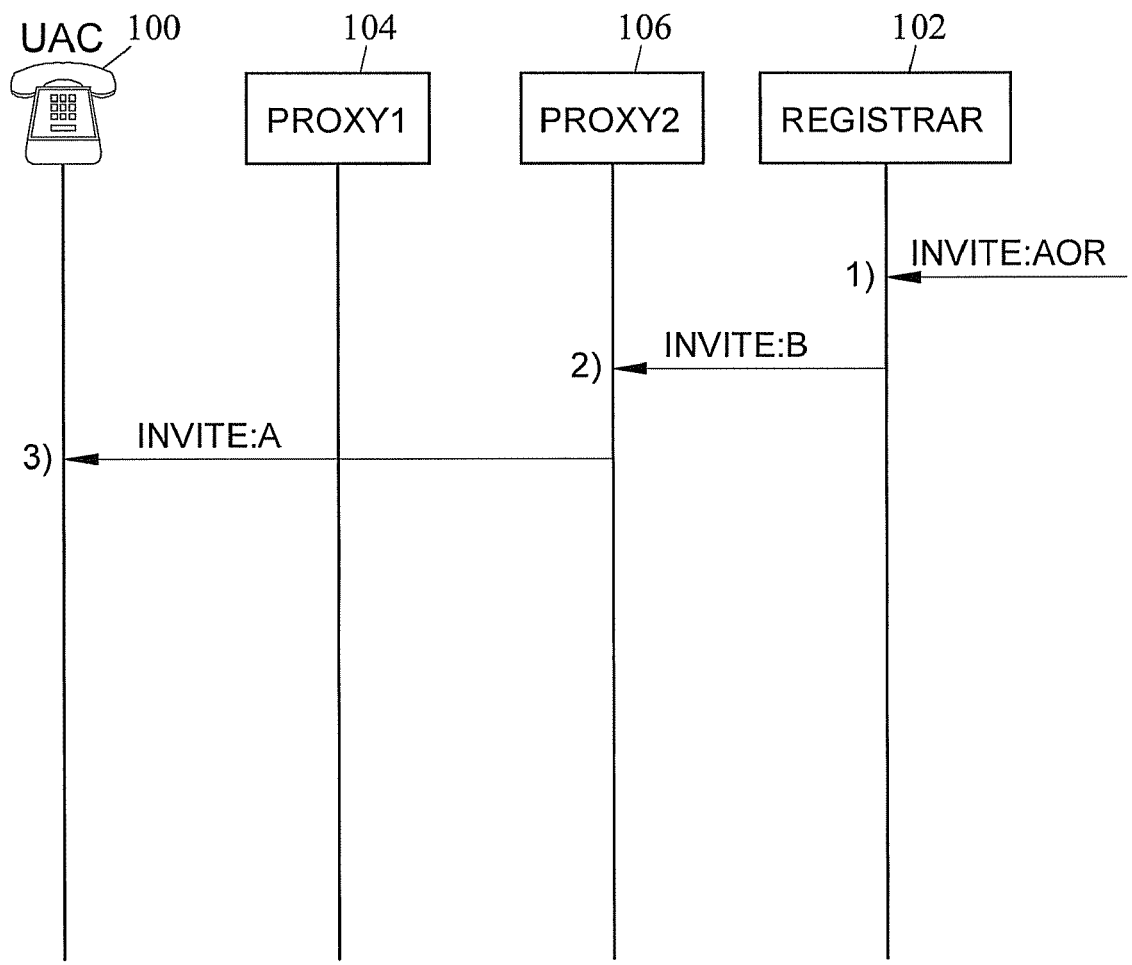
FIG. 2 is a message flow diagram illustrating the use of the statelessly reversible representation generated by the SIP cluster entity in FIG. 1 by a second SIP cluster entity when the first SIP cluster entity fails according to an embodiment of the subject matter described herein.

FIG. 2 is message flow diagram illustrating use of the statelessly reversible representation of the contact header field information generated in FIG. 1. Referring to FIG. 2, in line 1 of the message flow diagram, registrar 102 receives an invite message to the address of record of user agent client 100. Registrar 102 performs a lookup in its registration database and determines that the address registered for the address of record is B, which is the statelessly reversible representation of the original contact header field information. Registrar 102 sends an invite message with B in the to field to the cluster corresponding to proxies 104 and 106. In this example it is assumed that proxy 106 receives the invite message. It should be noted that proxy 106 does not store any state information regarding the original registration context or the original contact header field information.

In line 3 of the message flow diagram, proxy 106 algorithmically converts B to the original contact header field information by performing the reverse of the original mapping operation and removing the cluster information. Continuing with the example above, proxy 106 may replace SIP:line1%40192.168.1.17@proxy.example.com in the contact header field with SIP:line1@192.168.1.17. Proxy 106 sends the invite message with the original contact header field information in the to header field to user agent client 100. If encryption is used to generate the statelessly reversible representation of the contact header field information, proxy 106 may generate the original contact header field information by performing a decryption operation that reverses the encryption information. Further, as in the non-encrypted case proxy 106 may remove any information for reaching the cluster to which proxy 106 belongs from the contact header field.

Figure 3:
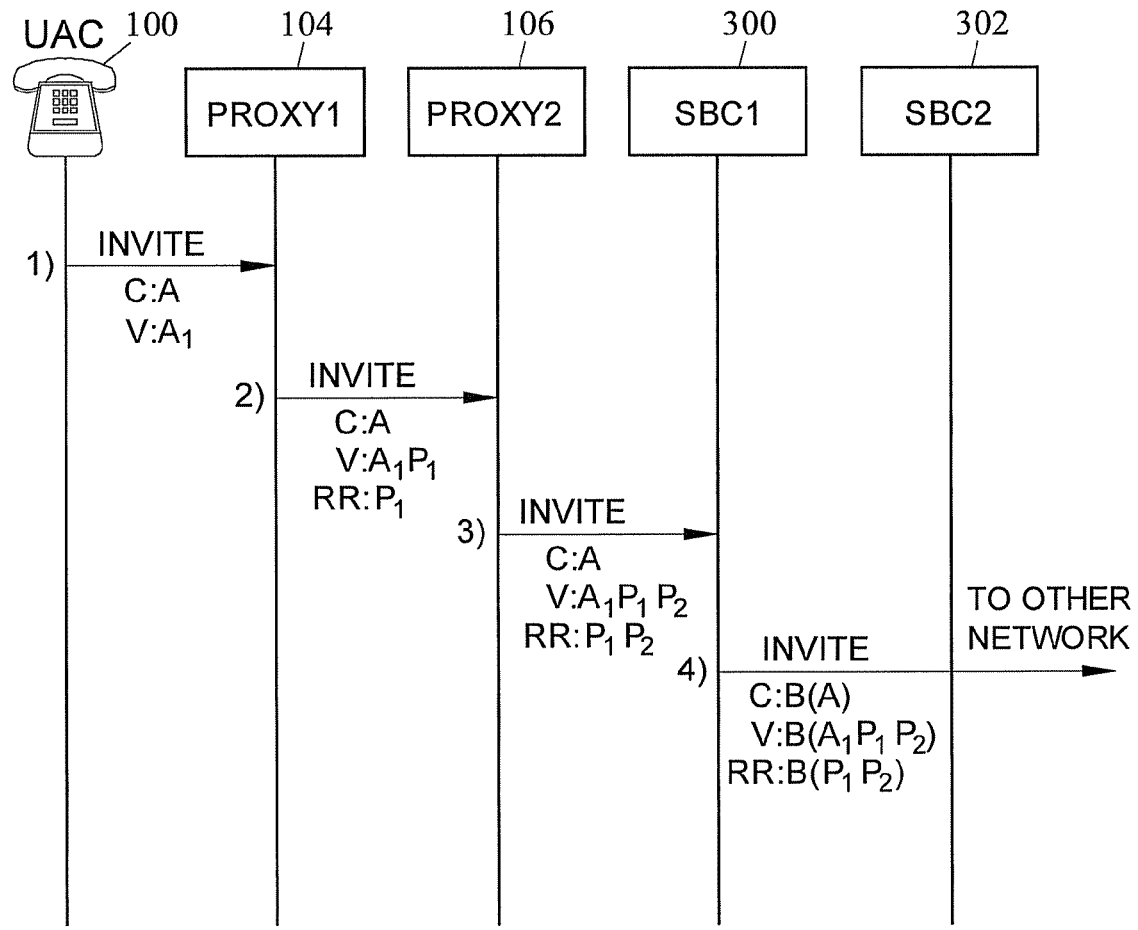
FIG. 3 is a message flow diagram illustrating the generation of statelessly reversible representations of SIP record route, via, and contact header field information by SIP cluster entities according to an embodiment of the subject matter described herein.

The subject matter described herein is not limited to generating and using statelessly reversible representations of SIP contact header field information in a registration context. The statelessly reversible representations may be generated and used by any SIP cluster nodes to avoid the need for synchronization between cluster nodes in a variety of SIP contexts. For example, for topology hiding, it may be desirable to collapse or stateless reversibly map a via header field, a record route header field, a call id header field, a path header field, a service route header field, a to header field, a from header field, a referred to header field, a referred by header field, or any other field of the SIP message that contains SIP information that an operator may wish to obscure. FIG. 3 is a message flow diagram illustrating the generation and use of statelessly reversible representations of contact, via, and record route header fields in a SIP message. Referring to FIG. 3, in line 1 of the message flow diagram, user agent client 100 sends an invite message to initiate a dialogue with a called party. For simplicity of illustration, only the contact and via header fields are shown in the message. In the illustrated example, the original value of the contact header field is A and the original value of the via header field $A_1$.

In line 2 of the message flow diagram, proxy 104 receives the invite message adds its via information to the via header field, and starts a record route header field with its address information. In line 3 of the message flow diagram, proxy 106 adds its information to the via and record route header fields and sends an invite message to session border controller 300. In this example, it is assumed that session border controller 300 operates at an administrative boundary between different networks and that it is desirable for session border controller 300 to take steps to hide topology information present in outbound messages being transmitted from the network of session border controller 300 to other networks. Accordingly, session border controller 300 generates statelessly reversible representations of the contact via, and record route header fields and sends the invite message to another service provider's network. The statelessly reversible representations are illustrated in FIG. 3 by B( ), where B( ) is the statelessly reversible representation generation function and the variable in the parenthesis (A, $A_1$, $P_1$, or $P_2$) is the content for which the statelessly reversible representation is being generated. A second session border controller 302 that may function as a cluster entity with session border controller 300 does not receive the statelessly reversible representations or the original information. The stateless reversible mapping technique used by SBCs 300 and 302 may be any of the techniques described above. The result of the statelessly reversible representations generated in FIG. 3 is topology hiding without requiring that cluster entities store state information regarding the original values or synchronize with each other. It should also be understood that the stateless reversible mappings may be performed on individual fields within each header field, e.g., individually on $A_1$, $P_1$, and $P_2$ in the via header field in line 4 or may be performed on the fields in each header field as a combination. For example, the statelessly reversible representation for an original via header field with individual field values of A, $P_1$, $P_2$ may be B(A), B($P_1$), B($P_2$) or B($AP_1P_2$), where $AP_1P_2$ is the concatenation of the individual via header field values.

Figure 4:
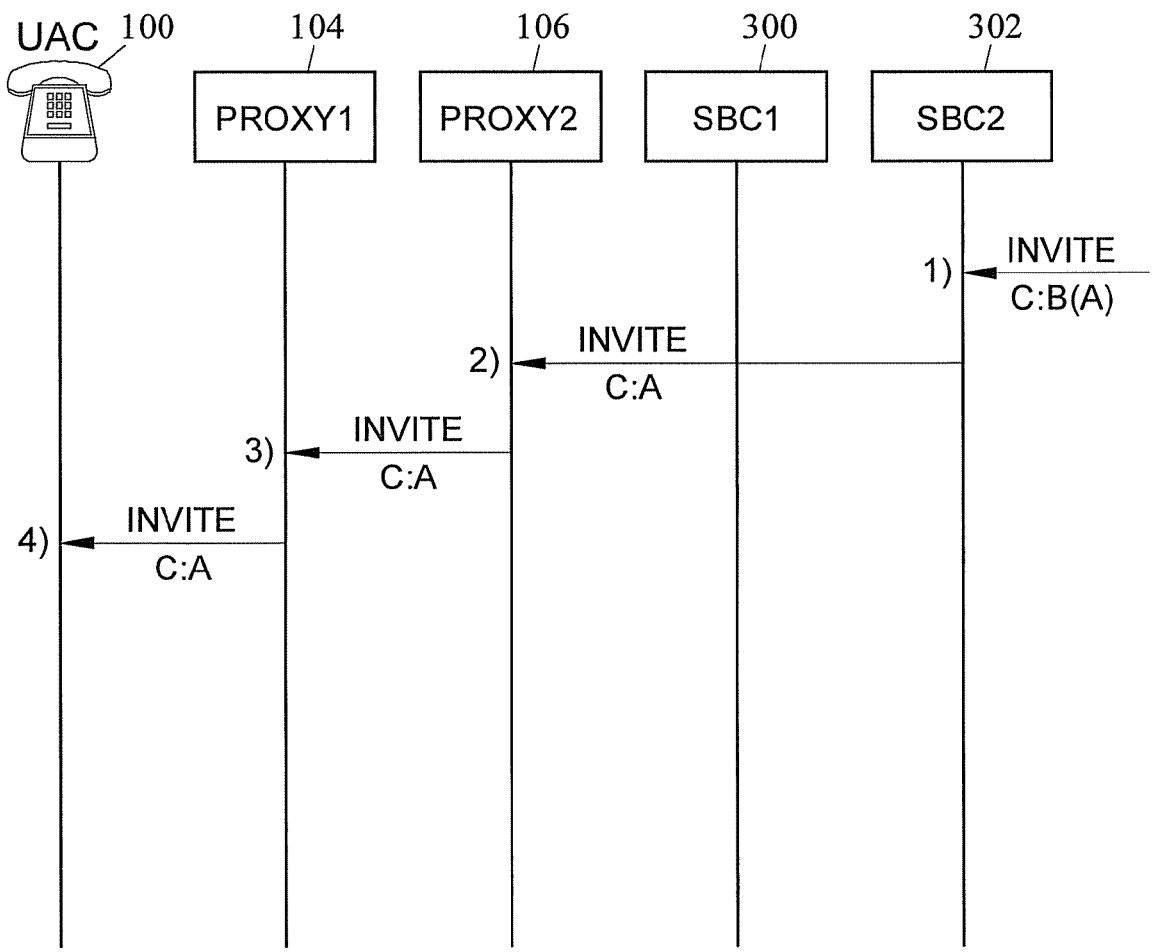
FIG. 4 is a message flow diagram illustrating use of the statelessly reversible representations generated by the SIP cluster entity in FIG. 3 at a SIP cluster entity that functions as a standby or load sharing entity for the SIP cluster entity illustrated in FIG. 3 according to an embodiment of the subject matter described herein.

FIG. 4 is a message flow diagram illustrating use of the statelessly reversible representation of the contact header field information generated in FIG. 3. Referring to FIG. 4, in line 1, SBC 302 receives an invite message containing B(A) as the contact header field information. In line 2, session border controller 302 applies the inverse of the statelessly reversible representation generation function to convert B(A) to A, the original contact header field information. SBC 302 sends the invite message with the original contact header field information to user agent client 100 in lines 2, 3, and 4.

Figure 5:
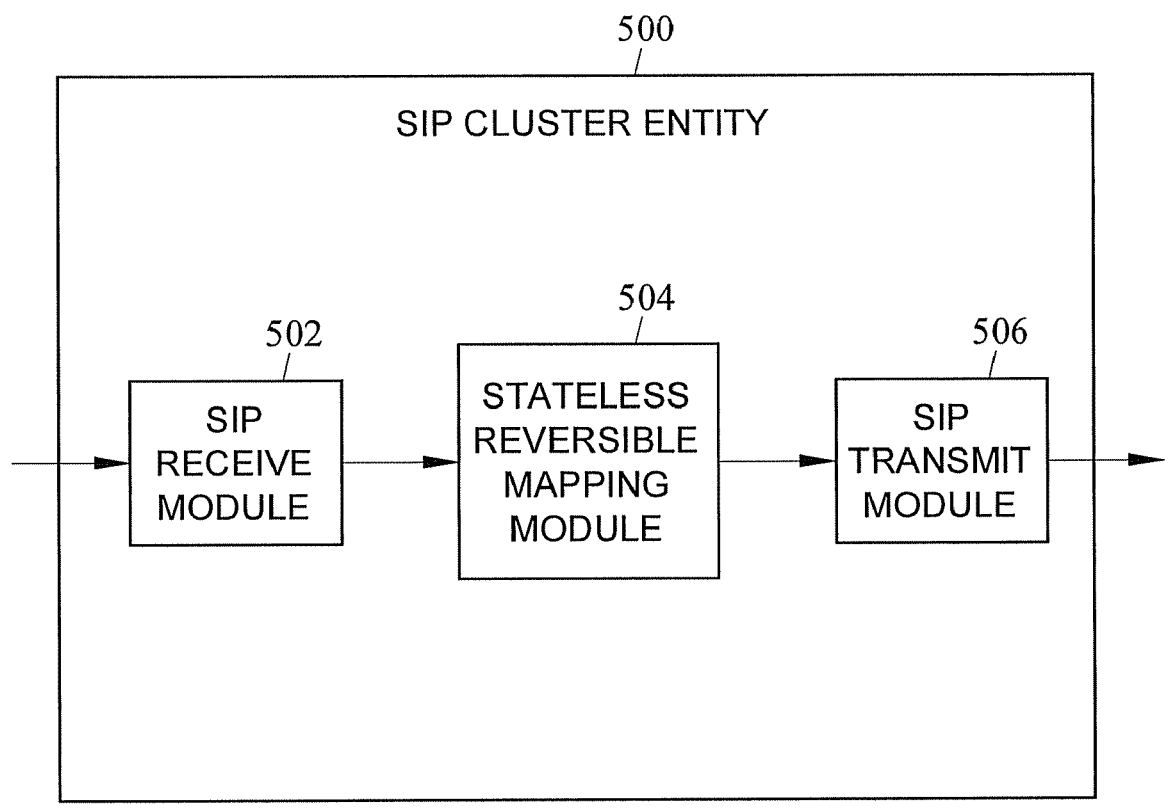
FIG. 5 is a block diagram illustrating an exemplary SIP cluster entity according to an embodiment of the subject matter described herein.

As stated above, the subject matter described herein may be implemented at any SIP entity that functions as a cluster entity with other SIP entities. FIG. 5 is a block diagram of an exemplary architecture of a SIP cluster entity for generating and using statelessly reversible mappings of SIP information according to an embodiment of the subject matter described herein. Referring to FIG. 5, SIP cluster entity 500 may be any type SIP entity capable of operating in a cluster with other SIP entities, including a proxy 104 or 106, a session border controller 300 or 302, or any other type of cluster entity. Referring to FIG. 5, SIP cluster entity 500 may include a SIP receive module 502 for receiving SIP messages including SIP information. SIP cluster entity 500 may further include a stateless reversible mapping module 504 for generating statelessly reversible representations of the SIP information in some SIP messages and for generating original SIP information from statelessly reversible representations in other SIP messages. Whether to generate or reverse a mapping depends on the message type and the origin and destination of a message. For example, for the register message illustrated in FIG. 1, module 504 may perform a forward mapping of the contact header field information to a statelessly reversible representation thereof. For the invite message received in line 2 of FIG. 2, module 504 may perform a reverse or inverse mapping of the contact header field information to its original representation. SIP cluster entity 500 may include a SIP transmit module 506 for transmitting SIP messages with the stateless reversible mappings to other network nodes. As stated above, SIP cluster entity 500 may be any suitable SIP entity, such as a proxy, a session border controller, or a back-to-back user agent.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for generating and using statelessly reversible representations of session initiation protocol (SIP) information by SIP cluster entities, the method comprising:
at a first SIP cluster entity including one or more processors, wherein the first SIP cluster entity comprises at least one of: a session border controller (SBC), a SIP proxy, and a back-to-back user agent:

receiving a first SIP message including SIP information, wherein the SIP information comprises information stored in one of a via header field, a record route header field, a call id field, a path field, a service route header field, a to field, a from field, a referred to field, and a referred by field of the first SIP message;

generating, in response to the first SIP message, a second SIP message including a statelessly reversible representation of the SIP information, wherein the statelessly reversible representation of the SIP information includes a representation that is algorithmically reversible by a second SIP cluster entity without storing state information for a SIP context to which the first SIP message belongs; and transmitting, to a SIP entity that is not a member of the cluster to which the first SIP cluster entity belongs, the second SIP message with the statelessly reversible representation and information for reaching the cluster.

2. The method of claim 1 wherein the first SIP message comprises a registration message, the SIP information includes information contained in a SIP contact header field of the registration message, and the SIP entity that is not a member of the cluster comprises a SIP registrar including a registration database.

3. The method of claim 2 wherein the SIP registrar maintains in its registration database, a mapping between the address of record of a SIP user agent client and the statelessly reversible mapping generated by the first SIP cluster entity.

4. The method of claim 3 comprising:
at the SIP registrar:
receiving a first invite message for the address of record of the SIP user agent client;
formulating, in response to the first invite message, a second invite message for the statelessly reversible representation contained in the registration database and transmitting the second invite message to the cluster to which the first SIP cluster entity belongs;
at a second SIP cluster entity in the cluster:
receiving the second invite message and translating the statelessly reversible representation in the second invite message to the SIP information; and
formulating a third invite message including the SIP information and forwarding the third invite message to the SIP user agent client.

5. The method of claim 4 wherein the second SIP cluster entity comprises one of a standby and a load sharing entity for the first SIP cluster entity.

6. The method of claim 1 wherein the first SIP message comprises an invite message.

7. The method of claim 1 wherein the statelessly reversible representation includes a plaintext version of at least a portion of the SIP information.

8. The method of claim 1 wherein the statelessly reversible representation includes an encrypted version of at least a portion of the SIP information.

9. A system for generating and using a statelessly reversible representation of SIP information by SIP cluster entities, the system comprising:
a first SIP cluster entity having one or more processors, wherein the first SIP cluster entity comprises at least one of: a session border controller (SBC), a SIP proxy, and a back-to-back user agent, the first SIP cluster entity including:
receive instructions executable by the one or more processors for receiving the first SIP message including SIP information, wherein the SIP information comprises information stored in one of a via header field, a record route header field, a call id field, a path field, a service route header field, a to field, a from field, a referred to field, and a referred by field of the first SIP message;

stateless reversible mapping instructions executable by the one or more processors for generating a second SIP message including a statelessly reversible representation of the SIP information, wherein the statelessly reversible representation of the SIP information includes a representation that is algorithmically reversible by a second SIP cluster entity without storing state information for a SIP context to which the first SIP message belongs; and transmit instructions executable by the one or more processors for transmitting, to a SIP entity that is not a member of the cluster to which the first SIP entity belongs, the second SIP message with the statelessly reversible representation and information for reaching the cluster.

10. The system of claim 9 wherein the first SIP message comprises a registration message, the SIP information includes information contained in a SIP contact header field of the registration message and the SIP entity that is not a member of the cluster comprises a SIP registrar having a registration database.

11. The system of claim 10 wherein the SIP registrar maintains in its registration database, a mapping between the address of record of a SIP user agent client and the statelessly reversible representation generated by the first SIP cluster entity.

12. The system of claim 11 wherein the SIP registrar:
receives a first invite message for the address of record of the SIP user agent client; and
formulates, in response to the first invite message, a second invite message for the statelessly reversible representation contained in the registration database and transmits the second invite message to the cluster to which the first SIP cluster entity belongs; and wherein the system further comprises a second SIP cluster entity in the cluster that:
receives the second invite message and translates the statelessly reversible representation in the second invite message to the contact header field information; and
formulates a third invite message including the contact header field information and forwards the third invite message to the SIP user agent client.

13. The system of claim 12 wherein the second SIP cluster entity comprises one of a standby and a load sharing entity for the first SIP cluster entity.

14. The system of claim 9 wherein the first SIP message comprises an invite message.

15. The system of claim 9 wherein the statelessly reversible representation includes a plaintext version of at least a portion of the SIP information.

16. The system of claim 9 wherein the statelessly reversible representation includes an encrypted version of at least a portion of the SIP information.

17. A non-transitory computer readable medium having stored thereon executable instructions that when executed by the processor of a computer performed steps at a first SIP cluster entity, wherein the first SIP cluster entity comprises at least one of: a session border controller (SBC), a SIP proxy, and a back-to-back user agent:

receiving a first SIP message including SIP information, wherein the SIP information comprises information stored in one of a via header field, a record route header field, a call id field, a path field, a service route header field, a to field, a from field, a referred to field, and a referred by field of the first SIP message;

generating, in response to the first SIP message, a second SIP message including a statelessly reversible representation of the SIP information, wherein the statelessly reversible representation of the SIP information includes a representation that is algorithmically reversible by a second SIP cluster entity without storing state information for a SIP context to which the first SIP message belongs; and transmitting, to a SIP entity that is not a member of the cluster to which the first SIP entity belongs the second SIP message with the statelessly reversible representation and information for reaching the cluster.

* * * * *